Oct. 29, 1946.  R. SARDESON ET AL  2,410,131
FILM HOLDING DEVICE
Filed July 22, 1942  2 Sheets-Sheet 2
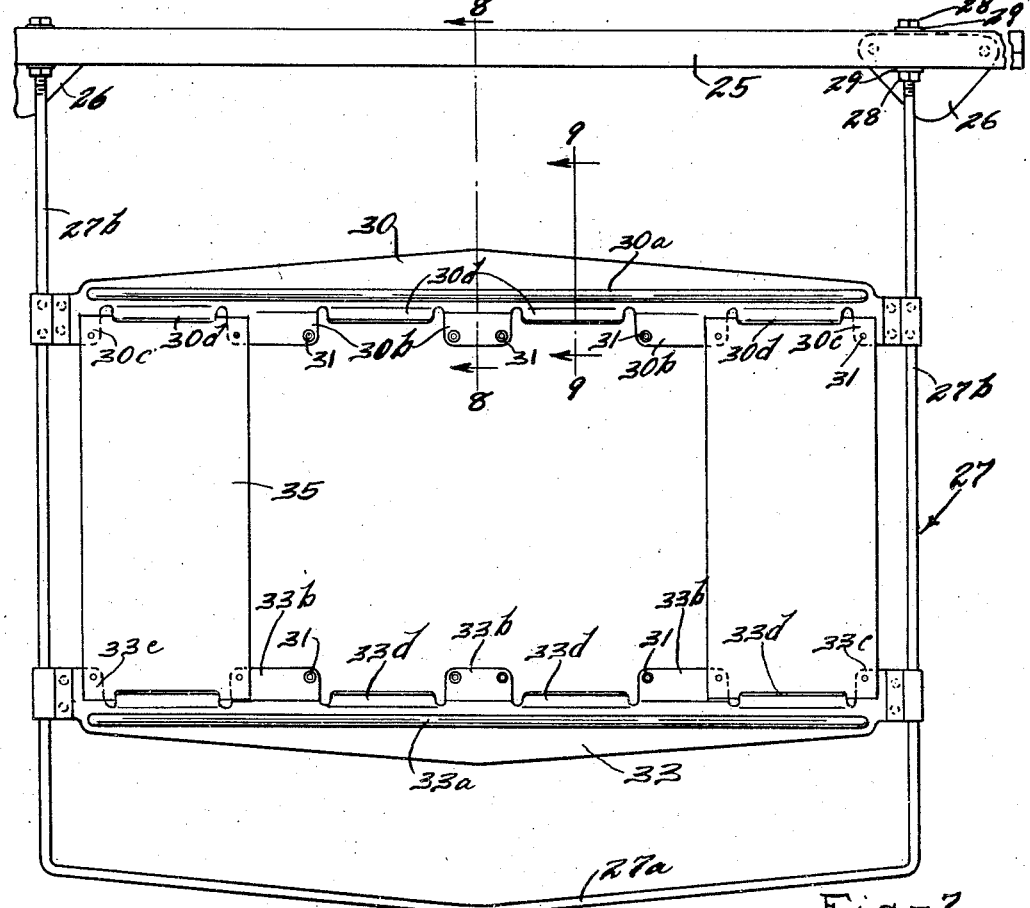
Fig.-7
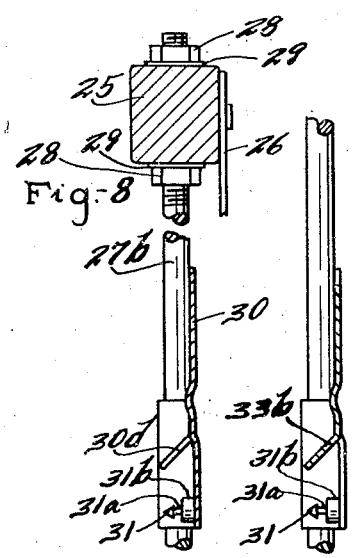
Fig.-8
Fig.-9
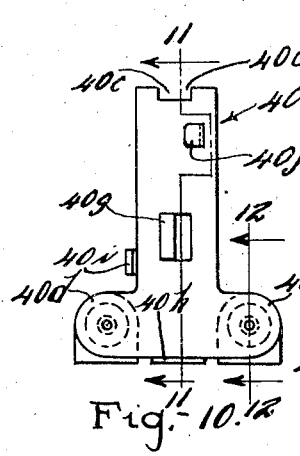
Fig.-10
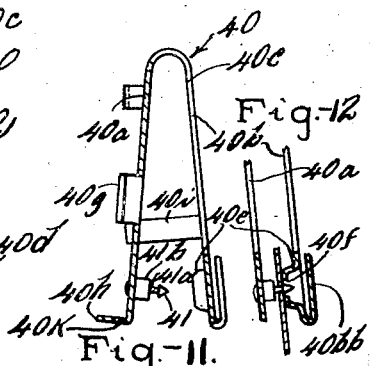
Fig.-11
Fig.-12
Inventors
ROBERT SARDESON
EDWARD H. SAVELA
By Chas. C. Reif.
Attorney Patented Oct. 29, 1946

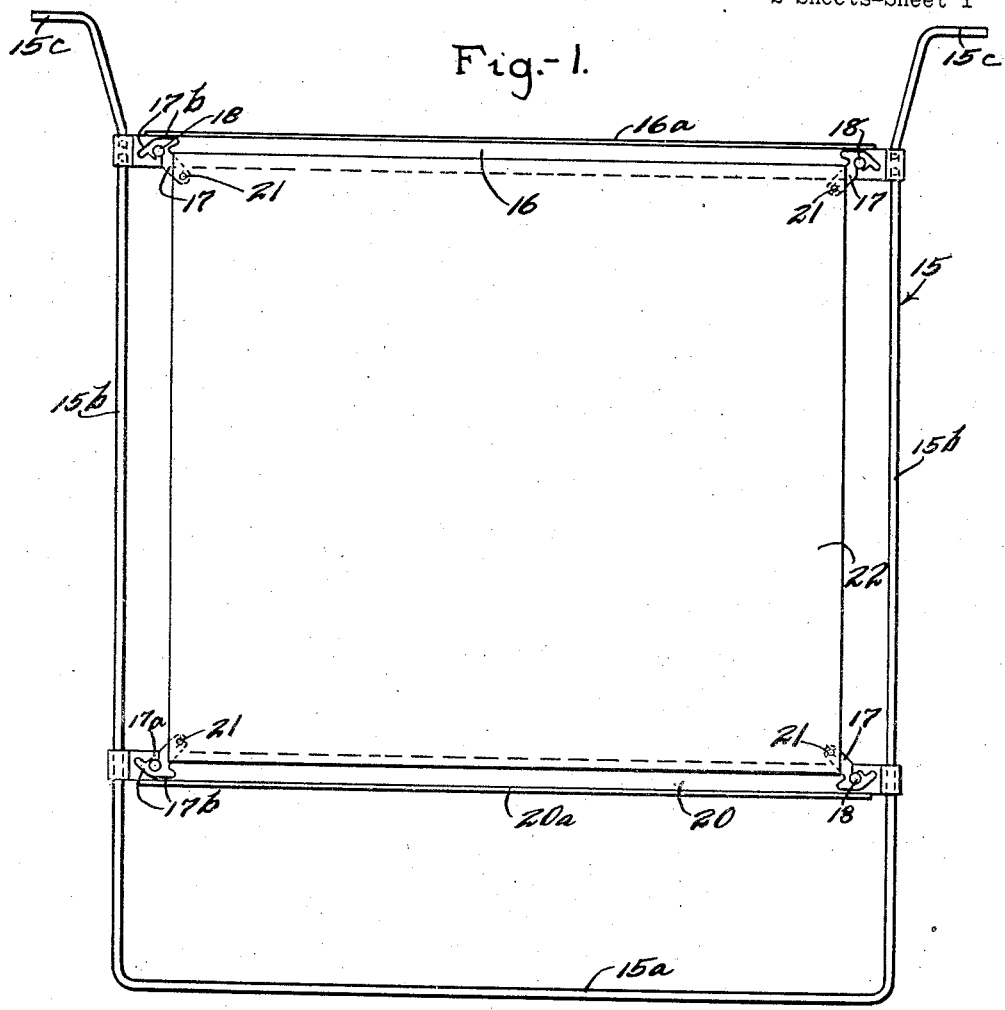
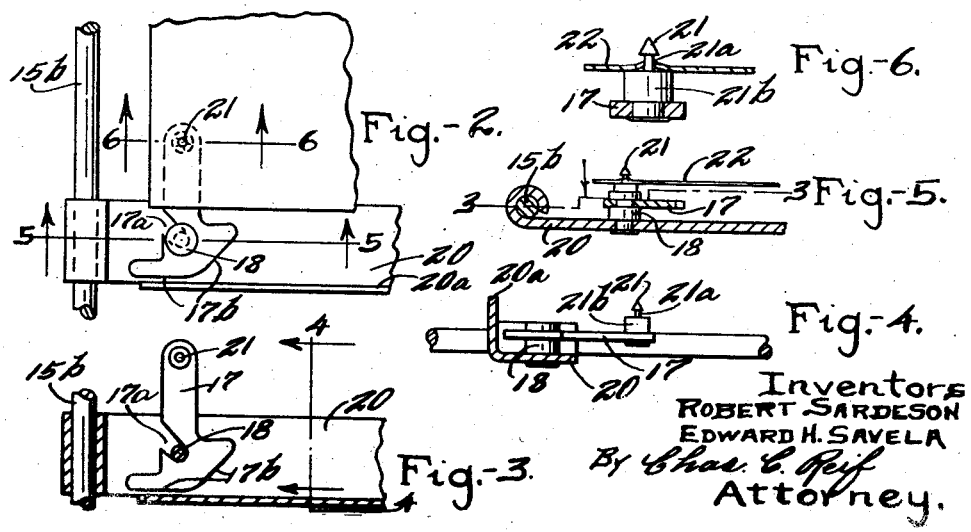

2,410,131

UNITED STATES PATENT OFFICE 2,410,131

FILM HOLDING DEVICE

Robert Sardeson and Edward H. Savela, Minneapolis, Minn., assignors to Pako Corporation, Minneapolis, Minn., a corporation of Delaware Application July 22, 1942, Serial No. 451,940

6 Claims. (Cl. 95—100)

This invention relates to a device for holding photographic films. It is customary to hold these films in substantially vertical position while they are being processed. It is desirable to have a film holder on which the films can be very easily and quickly placed, and one which will securely hold the film. It is also desirable to have some tension in a vertical direction on the film to hold it properly in position and to have some provision whereby the film, if of considerable width, can expand laterally. It is of great importance that the film holder have a minimum of contact surface for the film. This means that there will be less fluid adhering to the holder and film when it is transferred from one liquid to another and it also means that there is less moisture carried to be evaporated so that the drying operation is more rapid.

It is an object of this invention to provide a simple and efficient film holding device having a film holding means on which the film can be very easily and quickly placed and on which it is very securely held.

It is another object of the invention to provide a film holding device comprising a top member having film holding means, and a bottom member capable of vertical movement having film holding means, said film holding means being swingable about horizontal axes whereby a film held in said device will be tensioned vertically by said bottom member and can expand laterally due to the swinging movement of said film holding means and be tensioned laterally by said bottom member.

It is a further object of the invention to provide a film holding device having a bar at its top by means of which it can be suspended on horizontal supports, the same also having vertical parallel guide members, a fixed top member extending between said guide members and provided with a plurality of pairs of film holding means, a bottom member extending between and movable on said guide members also having thereon a plurality of pairs of film holding means vertically aligned respectively with the said pairs on said top member.

It is more specifically an object of the invention to provide a means for holding a film comprising a pointed member in the shape of a triangle in central longitudinal section, the same having a portion of reduced diameter, the sides of which make substantially a right angle with the bottom of said triangle, said bottom forming a shoulder whereby a film can be pushed over said pointed member into position surrounding said portion but cannot be moved past said shoulder over said pointed member.

It is also an object of the invention to provide a film holding device comprising a pair of resiliently opposed plate-like members, one of which has projecting therefrom and toward the other member a film holding means such as set forth in the above paragraph the other of said members having an apertured portion into which said pointed portion is receivable, said apertured portion having in the rear thereof a plate adapted to be engaged by the finger of the operator whereby said members may be moved toward each other to force a film onto said pointed member.

These and other objects and advantages of the invention will be fully set forth in the following description made in connection with the accompanying drawings in which like reference characters refer to similar parts throughout the several views and in which:

Fig. 1 is a view in front elevation of a film holding device;

Fig. 2 is a partial view similar to Fig. 1 shown on an enlarged scale, with arms 17 in a position indicating that the film 22 is in an expanded condition;

Fig. 3 is a vertical section taken on line 3—3 of Fig. 5 as indicated by the arrow;

Fig. 4 is a vertical section taken on line 4—4 of Fig. 3 as indicated by the arrows turned through 90 degrees;

Fig. 5 is a horizontal section taken on line 5—5 of Fig. 2 as indicated by the arrows;

Fig. 6 is a horizontal section taken on line 6—6 of Fig. 2 as indicated by the arrows;

Fig. 7 is a view in front elevation of a modified form of holding device;

Fig. 8 is a vertical section taken on line 8—8 of Fig. 7 as indicated by the arrows;

Fig. 9 is a vertical section taken on line 9—9 of Fig. 7 as indicated by the arrows;

Fig. 10 is a view in front elevation of another modified holding device;

Fig. 11 is a vertical section taken on line 11—11 of Fig. 10 as indicated by the arrows; and Fig. 12 is a vertical section taken on line 12—12 of Fig. 10 as indicated by the arrows.

Referring to the drawings, particularly Figs. 1 to 6, a film holding device is shown comprising a frame 15. While this frame might be variously constructed, in the embodiment of the invention illustrated it is shown as made from a cylindrical rod bent into substantial U-shape forming a bottom horizontal portion 15a and vertical spaced parallel portions 15b. Portions 15b diverge at their upper ends and are bent to form horizontally extending terminal portions 15c adapted to rest upon spaced horizontal supports. A top member 16 is provided formed of a flat strip, the same being bent around the members 15b and secured thereto in any suitable manner as by spot welding. Member 16 also has a horizontal flange 16a extending forwardly therefrom and extending almost all the distance between the ends thereof. Arms 17 are provided and these are pivoted to member 16 adjacent its ends, said arms being supported on studs or pivots 18 secured in member 16 in any suitable manner as by riveting. Pivots 18 are provided with peripheral grooves forming a reduced portion therein and arms 17 are provided with open ended slots 17a extending at an angle thereinto so as to be engaged over said reduced portions. Arms 17 are of increased width at their ends adjacent flange 16a and are provided with end surfaces 17b extending at an obtuse angle to each other and adapted to engage the bottom of flange 16a to limit the swinging movement of arms 17. Surfaces 17b are connected by a surface concentric with the surface of pivot 18. A bottom member 20 is provided similar to member 16, the same having its ends bent around vertical portions 15b and constructed and arranged to be slidable thereon. Member 20 also has a forwardly projecting horizontal flange 20a. Arms 17 are also pivoted to member 20 adjacent its ends, which arms are identical with arms 17 already described. Each of the arms 17 is provided with a film holding means and this comprises a pointed member 21 having the shape of a triangle in longitudinal central section and preferably of conical shape. Member 21 has in the rear thereof, and is carried by, a reduced portion 21a of member 21. The sides of portion 21a make substantially a right angle with the bottom of the cone or triangle above referred to so that said bottom forms a flat shoulder. Portion 21a is carried by a portion 21b of much greater transverse dimension having a flat surface substantially parallel with the bottom of member 21.

In operation frame 15 will, as stated, be supported upon a rack having horizontally extending supporting members engaged by portions 15c. A film shown as 22 will be supported upon the film holding means and in order to place a film thereon it is only necessary to press the same against pointed members 21. When the film is pressed against member 21 said member punctures the film and passes therethrough, the film passing onto and surrounding portion 21a. The film is now firmly and securely held on portion 21a and it cannot be removed therefrom past the shoulder or bottom of member 21 without further rupture. In practice when it is desired to remove the film it is given a slight jerk tearing the hole therein out through the edge. If it be attempted to remove the film the edge thereof about the puncture flattens or moves approximately into one plane exerting a gripping action upon the reduced portion 21a. This increases the difficulty of removing the film past the shoulder and over the pointed portion. The film is rather soft when wet and is quite slippery. The flat shoulder on the pointed portion is important in preventing the film from moving off of the pointed member in the processing operations. With the film supported as shown, it will be tensioned vertically by member 20 which can slide down on portions 15b. The side portions 15b form guide members for the lower member 20. The bottom member slides quite freely on said guide members so that it can move downward some distance more at one side than the other. This will thus tension the film even though the pointed members 21 are not the same distance from the edge thereof. When the film is placed on arms 17 they will be swung to incline inwardly away from members or portions 15b as shown in Fig. 1. A film of considerable width when wet, expands laterally appreciably. This laterally expanding movement can be accommodated by arms 17 swinging about their pivots toward side portions 15b. The film is also tensioned laterally appreciably by the horizontal component of the force exerted on the film by the weight of the lower member 20.

In Figs. 7 to 9 another form of holding device is shown. This comprises a frame formed of a bar 25 and while this may be made of various materials and various shapes, in the embodiment of the invention illustrated, it is shown as a wooden bar substantially square in transverse cross section. Member 25 has secured thereto cam plates 26 of substantially triangular shape having rounded corners which function when the device is moved through a processing machine such as shown in the prior patent of Glen M. Dye No. 1,863,689. A member 27 formed of a cylindrical rod is provided and bent into substantial U-shape, the same thus having a bottom portion 27a which inclines downwardly slightly toward the center and vertical side portions 27b which are threaded at their upper terminal ends and pass through bar 25. Portions 27b are equipped with nuts 28 and washers 29 at each side of bar 25 and are thus held securely therein. A top member 30 is provided extending between portions 27b, the same having its ends bent around said portions and secured thereto in any suitable manner as by spot welding. Member 30 is shown as of plate-like form, the same having a strengthening rib 30a formed therein and having spaced depending flat portions 30b disposed in vertical planes. The central portion 30b is shown as of less width than the side portions 30b and member 30 also has adjacent its ends the flat portions 30c extending downwardly the same distance as portions 30b. The portions 30b are provided adjacent their lower corners with film holding means comprising a pointed member 31, a reduced portion 31a and a larger portion 31b which are identical with portions 21, 21a and 21b already described. Portions 30c are also provided with film holding means comprising portions 31, 31a and 31b. A bottom member 33 is provided similar in form to member 30, but in inverted position relative thereto. Said portion 33 has its ends bent around vertical portions 27b and these end portions are constructed and arranged to slide freely on portions 27b. Member 33 has a strengthening rib 33a and has the upwardly extending spaced portions 33b which are disposed in vertical planes and are vertically aligned respectively with portions 30b. Member 33 also has the portions 33c similar to and vertically aligned with portions 30c. Member 30 between each portion 30c and the adjacent portion 30b and between portions 30b is provided with a depending flange 30d projecting at an angle of substantially 45 degrees, the same being shown as projecting forwardly. Similar flanges 33d are formed on member 33 and these are shown projecting upwardly substantially at an angle of 45 degrees, the same being vertically aligned with flanges 30d. Portions 33b and 33c are also provided with the film holding means 31 having the portions 31a and 31b and these are vertically aligned with the corresponding film holding means on top member 30.

The holder just described has four pairs of vertically aligned film holding means and each pair can be used to hold a narrow film 35 as shown in Fig. 7. The films will be tensioned vertically by the weight of member 33 which as stated, can slide freely on guide members 27b. The bottom of member 33 slopes toward a central point and water or other liquid will readily run down to the central point and drip off. This gives better drainage than if the bottom were horizontal. The flanges 30d tend to direct any water which might be thereon away from the surface of the films 35 so that the same would drip freely away from the film. The flanges 33d give a stabilizing action or effect when the carrier is moved downwardly in a liquid to submerge the films. The flanges 30d also protect the film from anything dropping from above. Both the flanges 30d and 33d support the carrier when it is laid flat on a surface so that the pointed members 31 or the films do not come in contact with the surface. It will be noted that it is possible to use the same type of member for bottom member 33 as for top member 30. The flanges 30d and 33d have distinct functions on both members.

In Figs. 10 to 12 another form of film holding device is shown. This is formed of a plate 40 bent substantially at its center substantially 180 degrees, thus forming opposed portions 40a and 40b. A slot 40c is formed in the plate and extends quite a distance in portion 40b. Portion 40a is of increased width at its lower end having projecting portions 40d shown as having rounded ends and each is provided on its side adjacent member 40b with a film holding means 41 having a reduced portion 41a and a portion of greater transverse dimension 41b. This holding means is similar in all respects to film holding means 21 having the portions 21a and 21b already described. Portion 40b has pressed upwardly therefrom portions 40e illustrated as of substantially cylindrical form, the same each having an aperture 40f at its center through which portions 41 are adapted to pass when portions 40a and 40b are pressed toward each other. The material of member 40 is resilient so that members 40a and 40b can be pressed together and they will assume their normal spaced relationship when released. The lower end 40f of portion 40b has parts 40bb reversely bent upwardly to lie parallel to the main part of portion 40b and to overlie the open end of bosses or projections 40e. Portion 40a is provided with a struck-up lug 40g having its end extending parallel to the outer side of portion 40a and the lower end of portion 40a is bent outwardly to form a flange 40h parallel with a slot 40k extending parallel to the surface of side portion 40a. Portion 40b has a narrow lug 40i bent at right angles thereto and the same extends along the side of portion 40a. It will be seen that the portion 40a also has struck up therefrom a small lug 40j.

In operation when it is desired to hold a film on member 40 the film will be placed with its top portion between member 41 and portion 40e and the operator can then press sides 40a and 40b together with his thumb and finger, the thumb or finger engaging the outer sides of portion 40a and the part 40bb. The portions 41 will thus be pressed through the film and the top of portions 40e will press the film over portions 41 so that it will be positioned surrounding the reduced portions 41a. The pointed portions 41 enter portions 40e through the apertures 40f. The operator can thus have his finger or thumb over portion 40bb without any danger of being pricked by the sharp end of portion 41. Portion 40e could be of sufficient depth to protect the finger or thumb of the operator from pointed member 41. Portion 40i forms a stop for the edge of the film and prevents the same from being inserted too far upwardly in the holder. Member 40 can be supported on a rod or other member extending through the bight at the top thereof. Member 40 can also be supported by a rod passing under the bent ends of lugs 40j and 40g and through slot 40k. Lug 40j will be sprung somewhat and member 40 will be firmly held in position.

From the above description it will be seen that we have provided a very simple and efficient film holding means and one on which the film can be very quickly and easily placed and on which it will be very securely held. It is impossible to remove the film from reduced portions 21a, 31a and 41a without further rupturing the same. The film is firmly held even though the gelatinous surface is wet and slippery. When the film is wet and the pins 21, 31 and 41 are wet the film might slip off the pins but for the shoulders formed by reduced portions 21a, 31a and 41a. It is pointed out that there is an extremely small film contacting surface on portions 21a, 31a and 41a which are the parts contacted by the film. This means that less water or moisture will be retained on the holder or the adjacent part of the film and that there is less moisture to evaporate so that the drying operation will be facilitated and speeded up. The film holders embodying the invention are quite simple in construction, are easily made and are highly efficient in use. The films are properly supported under the desired tension and provision is made for lateral or horizontal expansion. With narrow films such as shown in Fig. 7, the lateral expansion is not sufficient to require any particular provision therefor. All of the devices illustrated have been amply demonstrated in actual practice, found to be very successful and efficient and are being commercially made.

It will of course be understood that various changes may be made in the form, details, arrangement and proportions of the parts without departing from the scope of applicants' invention, which generally stated, consists in a device capable of carrying out the objects above set forth, in the parts and combinations of parts disclosed and defined in the appended claims.

What is claimed is:

1. A film holding device having in combination, a frame comprising spaced parallel vertical guides, a top member extending between and secured thereto, arms pivoted to said member adjacent said guides swingable about horizontal axes, a bottom member extending between and vertically slidable on said guides, arms pivoted to said bottom member adjacent said guides and freely swingable about horizontal axes, film holding means carried by said arms adjacent the free ends thereof whereby a film can be supported on said means extending therebetween and is held under vertical tension by said bottom member and can expand laterally and be laterally tensioned by the swinging movement of said arms.

2. A film holding device having in combination, a frame comprising spaced parallel vertical guides, a top film holder extending between said guides having at each side thereof laterally swingable film holding means, a bottom film holding member extending between and slidable on said guides having at each side laterally and freely swingable film holding means whereby a film may be supported on said means and will be tensioned vertically by said bottom member and can expand laterally and be tensioned laterally by the horizontal component of the swinging movement of said film holding means due to the weight of said bottom film holding member.

3. The structure set forth in claim 2 and means for limiting the swinging movement of said film holding means.

4. A film holding device having in combination, a frame comprising spaced vertical guides, a top member extending between and secured thereto, a second member of appreciable weight positioned below the top member and vertically slidable on said guides, arms swingably pivoted to said members, film holding means adjacent the free ends of the arms, said arms being adapted to swing to an angular position coincident with the attaching of a film to the film holding means so that the weight of the slidable second member exerts a tensioning effect in both vertical and lateral directions.

5. A film holding device having in combination, a frame comprising spaced vertical guides, a top member extending between and secured thereto, a second member of appreciable weight positioned below the top member and vertically slidable on said guides, arms swingably pivoted to said members, said arms having pointed pins thereon spaced from their pivots, said pins having reduced portions forming flat shoulders thereon, said arms being adapted to swing to an angular position coincident with the attaching of a film to said pins so that the weight of the slidable second member exerts a tensioning effect in a vertical direction and said weight due to the horizontal component of movement of said arms also exerts a tensioning effect in lateral directions.

6. A film holding device having in combination, a frame comprising spaced parallel vertical guides, a top member extending between and secured thereto, arms pivoted to said member adjacent said guides swingable about horizontal axes, a bottom member extending between and vertically slidable on said guides, arms pivoted to said bottom member adjacent said guides and swingable about horizontal axes, film holding means carried by said arms adjacent the free ends thereof whereby a film can be supported on said means extending therebetween and is held under vertical tension by said bottom member and can expand laterally by the swinging movement of said arms, said arms having surfaces extending at an angle to each other and means on said members respectively engageable by said surfaces for limiting the swinging movement of said arms.

ROBERT SARDESON.
EDWARD H. SAVELA.